United States Patent
Drie

Patent Number: 6,029,955
Date of Patent: Feb. 29, 2000

[54] COUNTERBALANCED DUAL SUBMARINE-TYPE LIQUID MIXER PAIRS

[76] Inventor: Gerhardt Van Drie, 724 W. Pine Ave., El Segundo, Calif. 90245

[21] Appl. No.: 09/317,809

[22] Filed: May 24, 1999

Related U.S. Application Data

[60] Provisional application No. 60/089,588, Jun. 17, 1998, and provisional application No. 60/086,633, May 23, 1998.

[51] Int. Cl.[7] ........................................... B01F 3/04
[52] U.S. Cl. ........................... 261/64.5; 261/81; 261/120; 261/123
[58] Field of Search ............................ 261/38, 42, 64.5, 261/81, 82, 120, 123, DIG. 47

[56] References Cited

U.S. PATENT DOCUMENTS

| | | | |
|---|---|---|---|
| 2,499,816 | 3/1950 | Carter, Jr. | 261/81 |
| 2,715,099 | 8/1955 | Stuart | 261/DIG. 47 |
| 3,664,647 | 5/1972 | Snow et al. | 260/81 |
| 3,683,627 | 8/1972 | Girden | 261/123 |
| 3,685,810 | 8/1972 | Calcote | 261/81 |
| 3,788,616 | 1/1974 | Clough, Jr. . | |
| 4,060,574 | 11/1977 | Verner et al. | 261/123 |
| 4,070,423 | 1/1978 | Pierce | 261/123 |
| 4,363,212 | 12/1982 | Everett . | |
| 4,595,296 | 6/1986 | Parks . | |
| 4,779,990 | 10/1988 | Hjort et al. . | |
| 4,919,849 | 4/1990 | Litz et al. . | |
| 5,156,788 | 10/1992 | Chesterfield et al. . | |
| 5,198,156 | 3/1993 | Middleton et al. . | |
| 5,316,671 | 5/1994 | Murphy | 261/120 |
| 5,587,114 | 12/1996 | Tharp | 261/DIG. 47 |
| 5,906,774 | 5/1999 | Loy | 261/120 |

*Primary Examiner*—C. Scott Bushey
*Attorney, Agent, or Firm*—Gene Scott Patent Law & Venture Group

[57] ABSTRACT

A counterbalanced, dual submarine-type liquid mixer provides a pair of counterbalanced mixing devices that move at opposing ends of a balance bar suspended above the surface of a liquid to be mixed. The bar is able to pivot so as to vertically move its ends alternately between a raised and a lowered position in such a manner that when one of the mixing devices is in a raised position in the liquid, the other of the mixing devices is in the lowered position and each of the two mixing devices tends to counterbalance the other. Each mixing device is buoyed upwardly in the liquid by the buoyant force of a gas captured below a concave surface of the mixing device and also by the negative buoyant force of the other mixing device when it has exhausted its buoyant gas. Alternately, each of the mixing devices, on its downward stroke is moved downwardly by its own weight (negative buoyancy) and by the buoyant action of the other mixing device which moves simultaneously on its upward stroke. Buoyant gas is injected and removed from under the mixing device's concave surface by a gas conduit channel integral with a supporting rod extending from the balance bar. The mixing device, in an alternate embodiment, uses a cable for interconnecting dual rigid caps or one cap and a counterweight to accomplish identical objectives.

6 Claims, 3 Drawing Sheets

COUNTERBALANCED DUAL SUBMARINE-TYPE LIQUID MIXER PAIRS

This application claims priority under 35 USC 119(e) to the filing date of previously filed provisional applications having Ser. Nos. 60/086,633 and 06/089,588 and assigned filing dates of May 23, 1998 and Jun. 17, 1998 respectively, both now expired, and which contains subject matter substantially the same as that described and claimed in the present application.

BACKGROUND OF THE INVENTION

1. Field of the Invention

This invention relates generally to mixing devices, and more particularly to a gas-induced and counterbalanced dual mixing device used for the purpose of aerating and agitating a liquid or slurry.

2. Description of Related Art

Water, sewage and industrial waste treatment are becoming crucially important in today's ever increasing population. They are also becoming extremely expensive processes, as more and more treatment is required. As such, new treatment means are continually being sought, for improved efficiency and economy in this industry. Aeration and agitation is an integral part of these treatment processes.

The following art defines the present state of this field:

Clough, Jr., U.S. Pat. No. 3,788,616, teaches a "system for simultaneously aerating and agitating a body of liquid. The system comprises a body that is pivotally mounted in the liquid with its pivot point located intermediate its ends, and means for feeding air to the lower side of the body. The body is adapted to trap alternately at each end sufficient air to cause that end to rise in the liquid, and means are provided for releasing the air trapped at each end of the body when that end has risen a predetermined amount, with the result that the body oscillates on its pivot axis in see-saw fashion".

Everett, U.S. Pat. No. 4,363,212, teaches a "buoyancy prime mover that converts the potential energy of a gas buoyant within a liquid into rotating mechanical energy comprises a plurality of rigid or collapsible buckets joined by one or more chains with rotatable sprockets and shafts to form a continuous loop so that when the buoyant gas is trapped within the buckets, the buckets rise through the liquid and rotate the chain and sprockets to generate power".

Parks, U.S. Pat. No. 4,595,296, teaches an invention which "relates to a mixing and blending system in which pulsed air or gas bubbles of predetermined variable size and frequency are injected into a tank containing materials to be agitated or stirred for mixing or blending. The air introduced at the bottom of the tank through an air inlet opening. There may be more than one air inlet and the inlets may be provided with accumulator plates depending upon diameter and height of the tank in which the mixing and blending is taking place. The inlets are located so as to create circular torroidal flow of fluid in a generally vertical plane. The accumulator plate has the purpose of assisting the formation of essentially a single bubble from the compressed air charge made to the air inlet and increasing the time required for the bubble to rise through the liquid by causing it to be formed more quickly and closer to the bottom of the tank. Hence, the accumulator plate is utilized in low viscosity liquids such as water".

Hjort, et al, U.S. Pat. No. 4,779,990, teaches an "impeller apparatus for dispersing a gas into a liquid in a vessel includes a centrifugal flow turbine, the blades of which are formed with a substantially streamlined trailing surface terminated by a sharply pronounced spine. The blade is formed by a plate-like initial blank being cut to a shape having a central line of symmetry, the blank then being folded along the straight line of symmetry.

Litz, et al, U.S. Pat. No. 4,919,849, teaches a "gas-liquid mixing process and apparatus having a vessel with an axial flow down-pumping impeller in a draft tube has gas ingestion tubes extending into a body of liquid from a hollow portion of the impeller shaft or other fluid communication means with the overhead gas in the vessel. Upon gas-liquid mixing at liquid levels that interfere with vortex development by the impeller, gas is drawn from the overhead through the ingestion tubes into the body of liquid".

Small, U.S. Pat. No. 5,156,788, teaches a "device for use in the mixing of fluids, e.g. the gasification of liquids, comprises an elongate member including an internal passage; and, mounted on the elongate member via radial arms, one or more venturi members each having a convergent-divergent duct whose axis is substantially tangential to the elongate member, and in which the neck of the duct has an opening in communication, via passages in the radial, with the internal passage. On rotation of the device, reduced pressure in the duct neck draws fluid down the shaft of the elongate member".

Middleton, et al, U.S. Pat. No. 5,198,156, teaches a "turbine agitator assembly including a reservoir for liquid, a rotor mounted in the reservoir and with a plurality of radially extending blades, and sparger means for introducing a fluid into liquid in the reservoir. The fluid sparger means and the rotor are so constructed and arranged that, in use, the rotor blades (submerged in the liquid) and/or the liquid flow they generate disperse the sparged fluid. Each of the blades is hollow and has a discontinuous leading edge, only a single trailing edge along an acute angle, no external concave surface and an open radially outer end".

The prior art teaches a variety of means of mixing liquids such as turbines, rotors with blades and other various mechanical devices as well as gas-induced mixing. However, the prior art does not teach a light-weight, mixing device which traps gas bubbles naturally evolved within the liquid, nor one that uses this gas or an induced gas stream to provide the needed mixing. The prior art teaches a non-motorized gas-induced mixing apparatus where gas bubbles are used to aerate and agitate a liquid, and it teaches a non-motorized gas-induced mixing apparatus which uses the gas bubbles as an impetus to move a component through the liquid in order to agitate it as well. The present invention is an improvement on these devices providing advantages in efficiency, control and effectiveness. It fulfills these needs and provides further related advantages as described in the following summary.

SUMMARY OF THE INVENTION

The present invention teaches certain benefits in construction and use which give rise to the objectives described below.

The present invention, a counterbalanced, dual submarine-type liquid mixer provides a pair of counterbalanced mixing devices that move at opposing ends of a balance bar suspended above the surface of a liquid to be mixed. The bar is able to pivot so as to vertically move its ends alternately between a raised and a lowered position in such a manner that when one of the mixing devices is in a raised position in the liquid, the other of the mixing devices is in the lowered position and each of the two mixing devices tends to counterbalance the other. Each mixing device is buoyed upwardly in the liquid by the buoyant force of a gas captured below a concave surface of the mixing device and also by the negative buoyant force of the other mixing device when it has exhausted its buoyant gas. Alternately, each of the mixing devices, on its downward stroke is moved downwardly by its own weight (negative buoyancy) and by the buoyant action of the other mixing device which moves simultaneously on its upward stroke. Buoyant gas is injected and removed from under the mixing device's concave surface by a gas conduit channel integral with a supporting rod extending from the balance bar.

A primary objective of the present invention is to provide a submarine-type liquid mixer for use in large vessels of 55 gallons or more, as well as for in-stream aeration for bodies of water needing treatment, having advantages not taught by the prior art.

Another objective is to provide a mixer having vertical motion which is counterbalanced as a pair of alternating mixers wherein each mixer provides force for moving the other.

A further objective is to provide such a mixer having the capacity to use the weight and negative buoyant force of one of a pair of mixer caps, and the positive buoyant force of a trapped gas under the other of the caps to move both mixer caps.

This invention then has applications in the aeration and agitation for both tanks and bodies of water containing bacteria such as sewage and waste tanks, and those which contain other substances, such as chemicals, oil, and aqueous solutions of all kinds.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE PREFERRED EMBODIMENT

Figure 1:
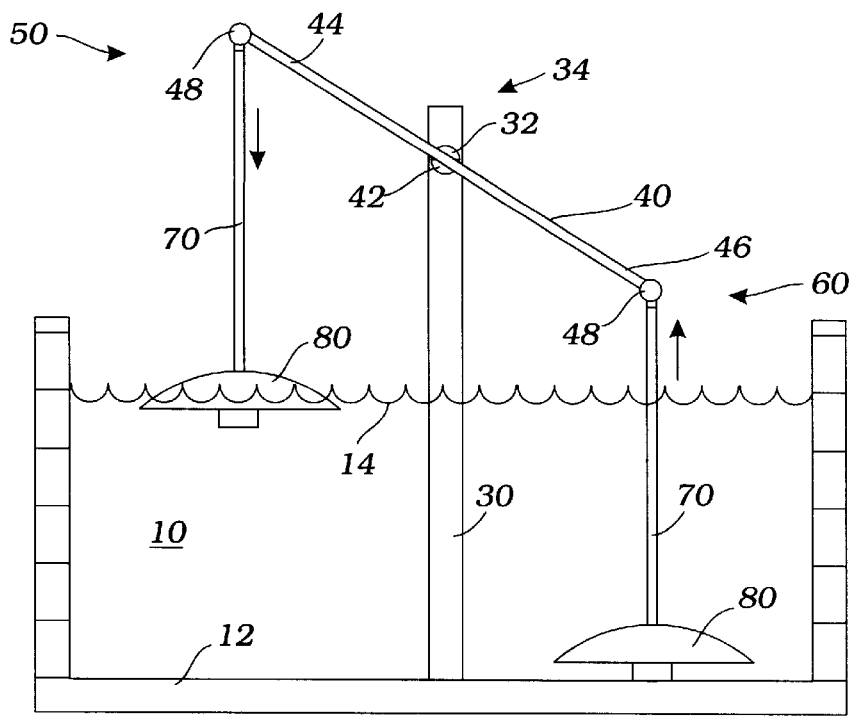
FIG. 1 is a mechanical schematic conception diagram showing a side elevational view of a preferred embodiment of the present invention.

The above described drawing figures illustrate the invention, an apparatus for mixing a viscous fluid 10 through the employment of a gas. The fluid 10 may be water or other liquids, but water will be used as representative throughout this specification. The apparatus, as shown in FIG. 1 comprises a vertically oriented, structural, central mixer support 30 providing a first means for mechanical pivoting 32, such as a simple rotational bearing, at an upper terminal end 34 thereof. A structural, linearly elongate balance bar 40 is pivotally joined at its centerpoint 42 to the first mechanical pivoting means 32 of the central mixer support 30 such that the balance bar 40 is pivotally enabled for moving opposing ends 44, 46 of the balance bar 40 in opposing directions, vertically, to alternately raised 50 and lowered 60 positions as is shown in FIG. 1. The opposing ends 44, 46 of the balance bar 40 each provide a second mechanical pivoting means 48 which may well be a simple rotational bearing also.

A vertically oriented, pair of structural, linearly elongate mixer tubes 70, are each pivotally engaged with one of the second mechanical pivoting means 48 so as to maintain the vertical orientation of the mixer tubes 70 as the opposing ends of the balance bar 40 move between the raised 50 and the lowered 60 positions.

A pair of rigid caps 80 are each joined near a bottom terminal end of one of the mixer tubes 70, the rigid caps presenting a downwardly facing concave surface 82, the concave surface being positioned so as to enable capture of upwardly moving gas bubbles thereunder. The raised and lowered positions 50, 60 established by the balance bar 40 enable the rigid caps 80 to move between a bottom 12 and a surface 14 of the viscous fluid 10 in which the rigid caps 80 are immersed. Now refering to FIG. 2, the mixer tubes 70 provide a conduit 74 therein for conducting a gas from a gas entry port 76 adjacent to the second mechanical pivoting means 48 to a gas discharge port 78 below the concave surface 82 such that a gas may be injected under the concave surface 82 to provide lift or buoyancy to the cap means 80, and such that a gas under the concave surface 82 may be exhausted therefrom for eliminating such buoyancy. Inventively, a valve means 110 is positioned near the gas entry port 76 of each of the mixer tubes 70, the valve means 110 includes a bias means 115 such as a spring for normally opening the valve means 110 when the rigid cap 80 is not immersed in the viscous fluid 10, and a float control means 120 for closing the valve means 110, against the force of the bias means 115, when the rigid cap 80 is immersed in the viscous fluid 10. This is clearly shown in FIG. 2 wherein a push rod 112 is used to enable the float control means 120 to push the valve means 110 closed. Arrows are placed in FIGS. 1 & 2 to clearly illustrate the mechanical motion of the several moving elements of the invention.

A counterweight means 90 is inventively fixedly positioned centrally below each of the concave surfaces 82 in a position for counteracting upending forces on each of the rigid caps 80. This is to say, that when the rigid cap 80 has a tendency to tilt, thereby spilling some of the gas which is trapped below surface 82 and which provides buoyancy to the cap 80, the counterweight means 90 tends to inhibit such a tilting.

Figure 2:
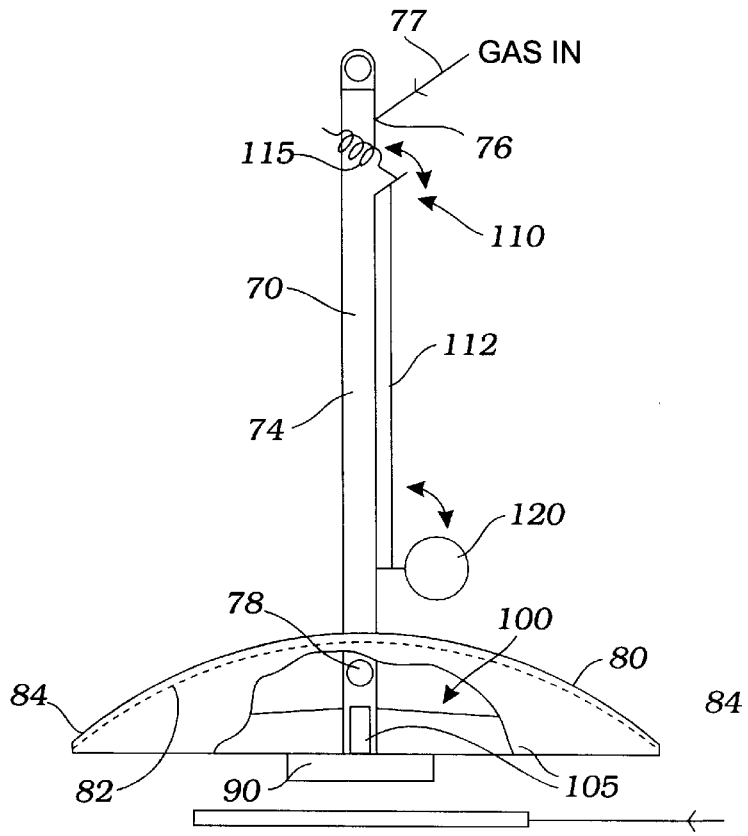
FIG. 2 is an enlarged view of a mixing arm thereof with a partial cutaway portion of a cap to expose constructional details thereunder.

For additional strength in the mounting of the rigid cap 80 to the mixer tube 70, a structural spoked means 100 with at least 3 or four radial legs 105 are welded or otherwise permanently attached into position, as shown in FIG. 2 in each of the rigid caps 80 for supporting a peripheral edge 84 of each of the rigid caps 80 and so that each of the caps 80 may be fastened of thin sheet metal material and yet provide a rigid structure. The spoked means 100 preferably extends radially between the mixing tube 70 and the peripheral edge 84 of each of the rigid caps 80.

Figure 3:
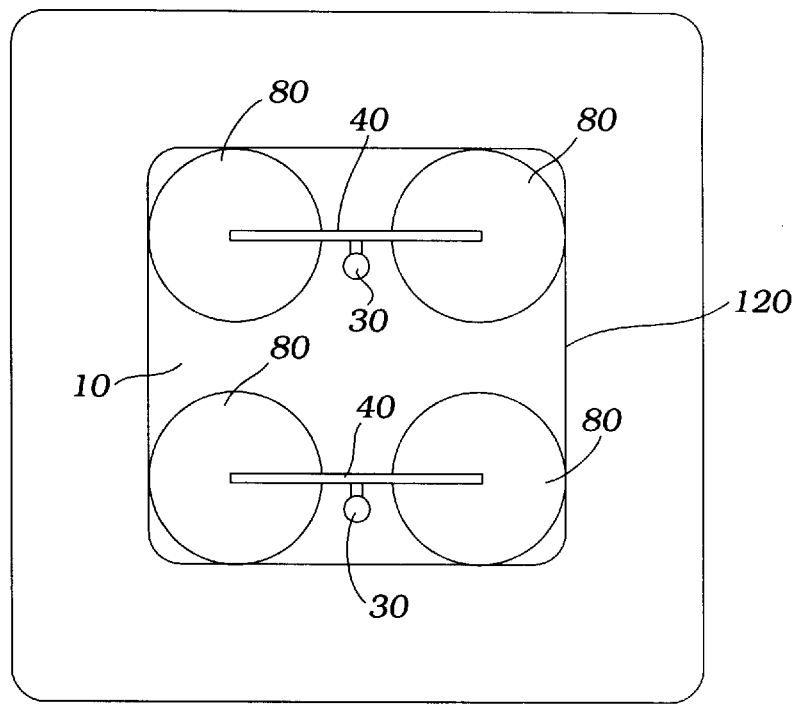
FIG. 3 is a plan view of a pair of counterbalanced dual mixers of the present invention.
Figure 4:
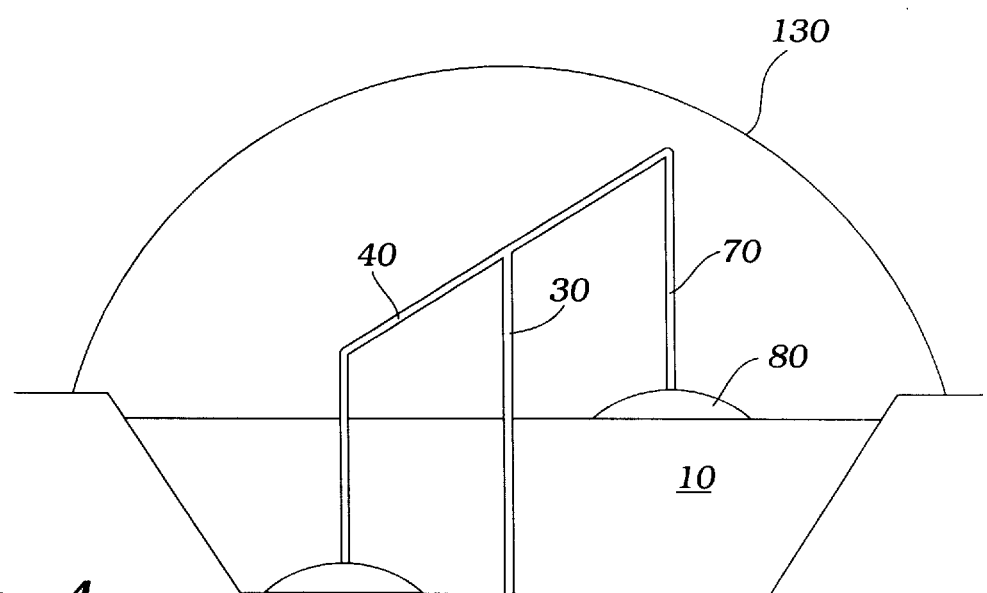
FIG. 4 is a side view thereof.

FIG. 3 is a schematic top plan view of a pair of the mixers of the present invention showing schematically how such mixers might be positioned in rectangular tank 120. Each pair of mixers operates independently. FIG. 4 is an elevational side view of the mixers of FIG. 3 showing schematically how a settling tank or pond might be configured with the mixer arrangement and how it might be covered (reference numeral 130).

Figure 5:
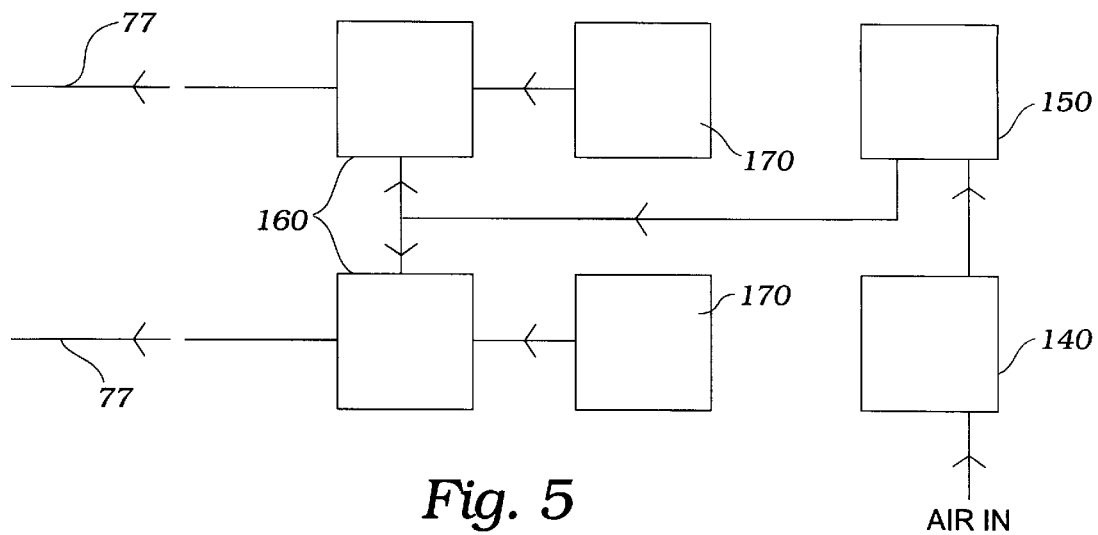
FIG. 5 is a schematic diagram showing a gas feed scheme used with the present invention.

FIG. 5 is a control schematic showing one approach to providing gas to a mixer arrangement of the present invention. Such a plumbing arrangement shows how air or any gas may be supplied to pairs of the mixers of this invention. A compressor motor pump combination 140 pressurizes a storage tank 150. Air, then is delivered under pressure to solenoid valves 160. Clocks 170 are used to actuate the valves 160 in alternating sequence to deliver air to the appropriate gas entry ports 76, through gas line 77, to accomplish alternately injecting air under the rigid caps 80 of the mixer pairs. Again, alternately, gas is automatically expelled through valves 110 when each cap 80 surfaces thereby dropping float 120 enabling spring 115 to open each valve 110.

Figure 6:
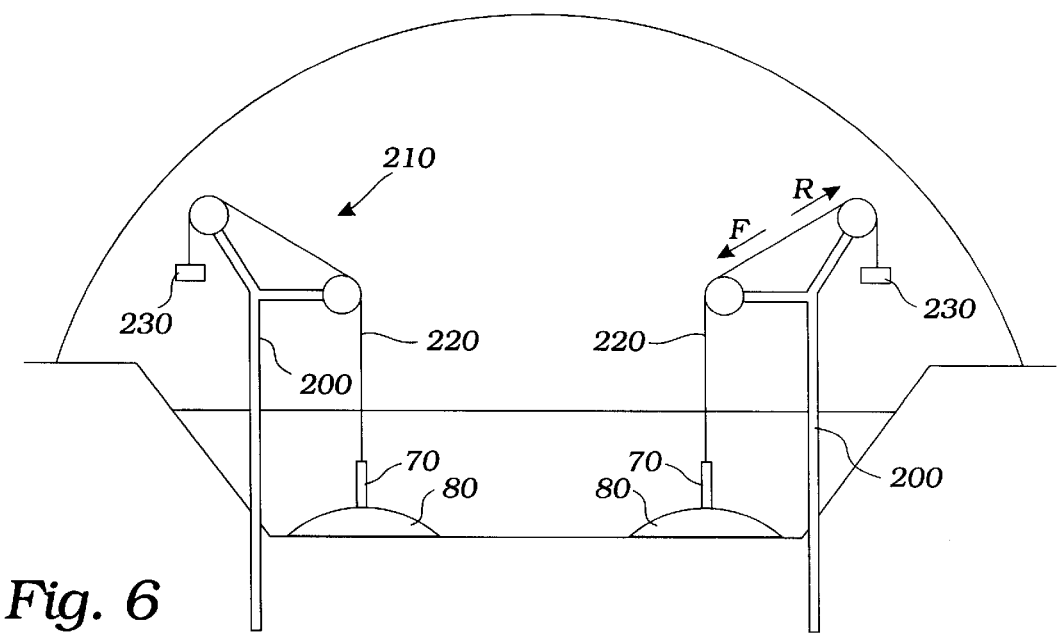
FIG. 6 is a mechanical schematic conception diagram showing a side elevational view of an alternate embodiment of the present invention.

In an alternate embodiment shown in FIG. 6 of the present invention, one or more of the rigid caps 80, as described above, are engaged with a structural, mixer support 200 which provides a pulley arrangement 210 for enabling the movement of a structural cable 220 engaged with the pulley arrangement to move in forward and reverse directions as shown by arrows "F" and "R." The mixer tube 70 described above, joins at an upper end with the cable and at a lower end with the rigid cap 80. The cable 220 moves the mixer tube 70 between the raised 50 and lowered 60 positions as previously described. A counterweight 230 is engaged with the other end of the cable 220 so as to counterbalance the rigid cap 80 during motion thereof. Again, a pair, or more of the mixers described above may be placed, as shown in FIG. 6, for mixing the fluid in a tank, lagoon, pond, etc. Although not shown in FIG. 6, the flexible gas lines 77 may be employed for delivery of a gas to the mixers, and the exhaust valve described above may be employed as well as was described for the first embodiment.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. An apparatus for mixing a viscous fluid within which the apparatus moves, the apparatus comprising:

a structural, mixer support providing a first means for mechanical pivoting at a terminal end thereof;

a structural, linearly elongate balance bar pivotally joined at its centerpoint to the first mechanical pivoting means such that the balance bar is pivotally enabled for moving opposing ends of the balance bar in opposing directions to alternately raised and lowered positions, the opposing ends of the balance bar each providing a second mechanical pivoting means;

a vertically oriented, pair of structural, linearly elongate mixer tubes, each of the mixer tubes pivotally engaged with one of the second mechanical pivoting means so as to maintain the vertical orientation of the mixer tubes as the opposing ends of the balance bar move between the raised and lowered positions;

a pair of rigid cap means, each one of the rigid cap means joined adjacent a bottom terminal end of one of the mixer tubes, the rigid cap means presenting a downwardly facing concave surface means so as to enable capture of upwardly moving gas bubbles thereunder;

the raised and lowered positions established by the balance bar enabling the rigid cap means to move between a bottom and a surface of the viscous fluid in which the rigid cap means are immersed;

the mixer tubes providing a conduit therein for conducting a gas from a gas entry port adjacent to the second mechanical pivoting means to a gas discharge port adjacent the concave surface such that a gas may be injected under the concave surface and such that a gas under the concave surface may be exhausted therefrom.

2. The apparatus of claim 1 further comprising a counterweight means positioned centrally below each of the concave surfaces in a position for counteracting upending forces on each of the rigid caps.

3. The apparatus of claim 1 further comprising a structural spoked means for supporting a peripheral edge of each of the rigid caps, the spoked means extending radially between the mixing tube and the peripheral edge of each of the rigid caps.

4. The apparatus of claim 1 further comprising a valve means at the gas entry port of each of the mixer tubes, the valve means including a bias means for normally opening the valve means when the rigid cap is not immersed in the viscous fluid, and a float control means for closing the valve means against a force of the bias means, when the rigid cap is immersed in the viscous fluid.

5. The apparatus of claim 1 further comprising a compressor motor pump combination for pressurizing a storage tank with a gas, said tank delivering the gas under pressure to solenoid valve means operated by clock means to alternately supply the gas to and exhaust the gas from the rigid caps.

6. An apparatus for mixing a viscous fluid within which the apparatus moves, the apparatus comprising:

a structural, mixer support providing a pulley arrangement for enabling the movement of a structural cable engaged with the pulley arrangement to move in forward and reverse directions;

a vertically oriented, structural, linearly elongate mixer tube, the mixer tube engaging with one end of the structural cable for moving the mixer tube between raised and lowered positions;

a rigid cap, joined adjacent to a bottom terminal end of the mixer tube, the rigid cap presenting a downwardly facing concave surface so as to enable capture of upwardly moving gas bubbles thereunder;

the raised and lowered positions established by the structural cable enabling the rigid cap to move between a bottom and a surface of the viscous fluid in which the rigid cap is immersed;

the mixer tube providing a conduit therein for conducting a gas from a gas entry port above the fluid surface to a gas discharge port adjacent the concave surface such that a gas may be injected under the concave surface and such that a gas under the concave surface may be exhausted therefrom;

a counterweight means engaged with the other end of the cable so as to counterbalance the cap means during motion thereof.

* * * * *